Dec. 5, 1944. E. E. JELLEY ET AL 2,364,369
DIFFUSING SCREEN
Filed Feb. 5, 1942
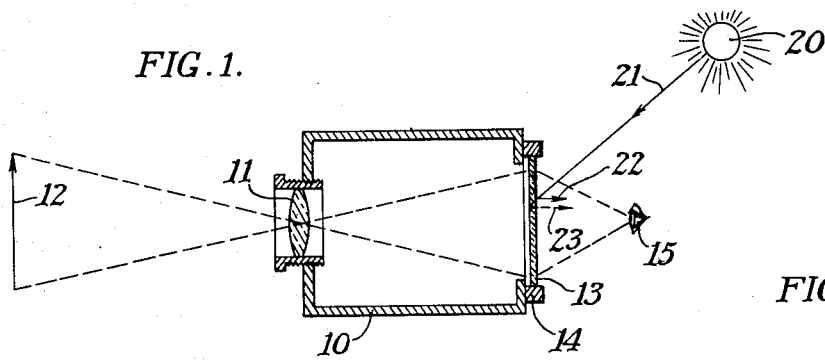
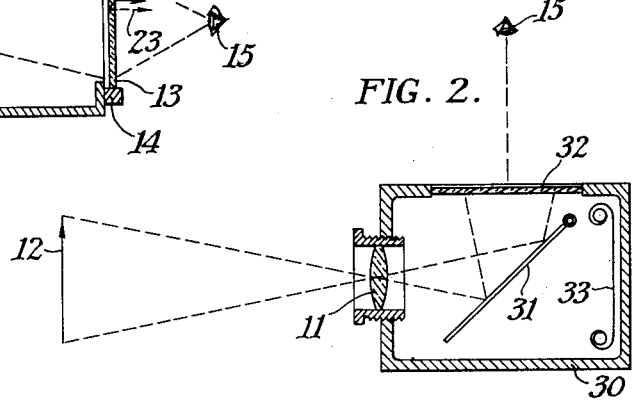
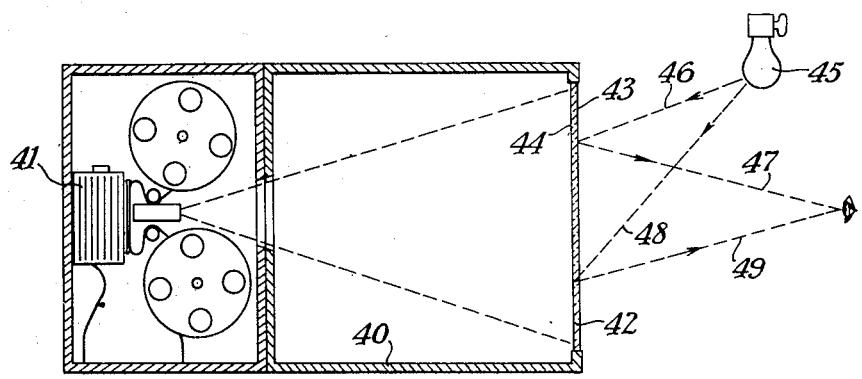
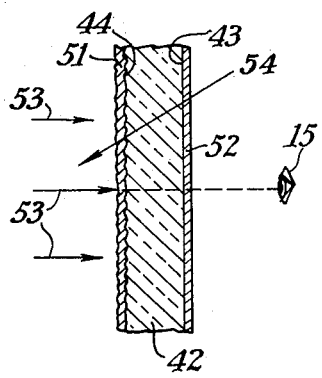
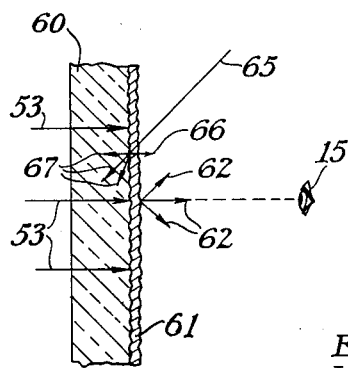
EDWIN E. JELLEY
HENRY C. STAEHLE
INVENTORS
BY
ATTY & AGT Patented Dec. 5, 1944

2,364,369

UNITED STATES PATENT OFFICE 2,364,369

DIFFUSING SCREEN

Edwin E. Jelley and Henry C. Staehle, Rochester, N. Y., assignors to Eastman Kodak Company, Rochester, N. Y., a corporation of New Jersey Application February 5, 1942, Serial No. 429,622

6 Claims. (Cl. 88—28.93)

This invention relates to translucent screens such as ground glass screens. Screens of this nature are used on cameras for focusing and as rear projection screens for displaying still or motion pictures.

It is the main object of the invention to improve such screens by reducing the reflections of light from the front, such reflections occurring either at the rough or the smooth surface of ground glass. The surface of the screen facing the observer is referred to as the front and when a ground glass is used, either the front or the rear surface may be the rough one. Also, additional diffusing material may be incorporated in the sheet itself, but the present invention relates only to screens having a rough surface. Since the image to be viewed is projected to the screen from the rear, any light striking the screen from the front and being reflected from either the front or the rear surface of the screen is annoying and tends to reduce the contrast of the main image. That is, it is the object of the invention to reduce these reflections of front illuminations from either the front or the rear surface.

Such reflections can be partly reduced by the inclusion of a coloring material in the glass or whatever transparent medium is used. This coloring material acts doubly on the light reflected from the rear surface of the screen, but also tends to reduce the light from the main image. Furthermore, the presence of an absorbing dye is ineffective when the rough surface is on the front as is preferable for many purposes to which translucent screens are put. When the rough surface is on the rear, the dye does not affect the specular reflection from the front smooth surface.

It has been proposed to reduce this smooth surface reflection by the use of an interference coating such as a quarter wave length layer of a fluoride on glass. Of course, many different types of coatings have been proposed and this particular one is merely given by way of example. However, the coating of the rough surface of a ground glass has not previously been considered. Simple theory tends to predict that such coating would interfere both with the reflection and with the diffusion of light at the surface and that such effects would be approximately equal. That is, simple theory would infer that the more the reflection is reduced, if at all, the more the diffusion would be reduced. Also, such reduction of reflection would be so small as to be worthless. Since high diffusivity is the primary property necessary to all image display screens, probably this explains why no one has previously experimented in this direction. However, we have found that interference coatings on the rough surface of even finely ground ground-glass act much more strongly in reducing unwanted reflection and even unwanted diffuseness than they do in reducing useful diffusion of transmitted light.

Therefore, according to our invention we provide a translucent screen for camera focusing or rear projection, comprising a translucent plate of glass or other light transmitting material, one surface of the plate being rough and having on this surface an optical interference layer for reducing reflection. Preferably the other surface of the plate also carries an optical interference layer, especially when the rough surface is on the side away from the observer. Since the invention acts only on reflections at the surfaces of the plate, the preferred embodiment of the invention is one in which the plate itself is transparent except for the rough surface, but of course the other scattering media in addition to the ground invention is applicable to screens incorporating surface.

In one embodiment of our invention, the ground surface faces the main light source and this embodiment has the advantage that it may be combined with the use of a light absorbing material further to reduce unwanted reflections. This embodiment preferably has the smooth surface of the screen also coated to reduce reflection.

The opposite embodiment of the invention with the rough surface toward the observer has the advantage that no coating is needed on the smooth surface and that even without such a coating, there is practically no specular reflection from the smooth surface. Other objects and advantages of the invention will be apparent from the following description when read in connection with the accompanying drawing in which:

Fig. 1 illustrates schematically a camera provided with means for ground glass focusing, Fig. 2 similarly illustrates a reflex camera, Fig. 3 similarly illustrates a rear projection system, Fig. 4 shows a ground glass according to one embodiment of the invention, Fig. 5 shows a ground glass according to a second embodiment of the invention.

In Fig. 1 a camera 10 having a focusing lens 11 receives light from an object 12 and forms a real image thereof on a ground glass 13 carried by a removable frame 14. This image is viewed by the eye 15 of the observer while focusing the lens and while finding the view. Light from an extraneous source 20 is indicated by arrow 21 striking the ground glass 13 and is reflected as indicated by arrows 22 and 23 by both the front and rear surfaces thereof. For consistency, the surface facing the eye of the observer is referred to as the front surface. If the rear surface is the rough one, the reflection from the front surface is specular and from the rear surface is diffuse.

This same situation holds in Figs. 2 and 3. In Fig. 2 a reflex camera 30 is schematically shown in which a reflector 31 removably positioned in front of the film plane 33 reflects light from the object 12 to a ground glass 32 on top of the camera. In Fig. 3 a housing 40 carrying motion picture projector 41 is provided with a front window having therein a ground glass 42 whose rear surface 44 is rough and whose front surface 43 is smooth. As before, light from an extraneous source 45 is specularly reflected as indicated by the rays 46 and 47 from the smooth front surface 43. Light from this same source 45 as indicated by rays 48 and 49 is diffusely reflected from the rear surface 44.

According to the invention, these annoying front illuminations and more specifically the reflections thereof are reduced by providing the rough surface of the ground glass (surface 44 in the case of Fig. 3) with an interference coating of proper thickness to reduce reflection. Interference coatings which consist of a single layer only should have a thickness approximately equal to one-quarter of the wave length or an odd multiple of quarter wave lengths of the light whose reflection is to be reduced. Multiple coatings have thicknesses whose relationship according to vector analysis is well established.

In the embodiment shown in Fig. 4 which is similar to the one shown in Fig. 3, the rear surface 44 of the ground glass 42 is the rough one and the front surface 43 is smooth. In this embodiment both surfaces are provided with interference coatings 51 and 52 respectively. Light from the rear as indicated by arrows 53 is diffused by the surface 44 and transmitted to the eye 15 of the observer. On the other hand, front illumination as indicated by the ray 54 is only slightly, if at all, reflected at the front surface 43 and only slightly, if at all, reflected at the rear surface 44. The phenomenon which reduces the reflection at the surface 43 by means of an interference layer 52 is well known. It was not previously known, however, that such coatings would operate at all on a rough surface as at 44. It was further not known that if such coatings did operate on such a surface that they would not reduce the diffusivity of such surface appreciably for transmitted light. Furthermore, a coating such as 51 apparently gives even more useful diffusion of the transmitted light.

The main plate 42 is preferably a completely transparent sheet but may include additional diffusing materials or may include a light absorbing dye or stain of very low density.

In Fig. 5 the ground glass 60 has the rough surface on the front and this rough surface is provided with an interference layer 61. As before, light from the rear as indicated by arrows 53, is highly transmitted and diffused as shown by arrows 62. Front illumination as shown by the ray 65 is diffused at the layer 61 as indicated by arrows 67 but only a relatively small amount of light as indicated by the small arrow 66 is diffusely reflected. Comparing an ordinary ground surface with one provided with the layer 61 according to the invention, it is noted that this layer 61 increases the transmission, has practically no effect on the diffusivity over useful angles but does give a much higher ratio of transmitted and diffused light to reflected and diffused light.

If the rear surface of the glass 60 is also provided with an interference layer, the rays 67 pass harmlessly to the rear. However, since these rays are completely diffused anyway and their only effect after reflection at the rear surface of the plate is to reduce the contrast of the image formed in the front surface, an interference layer on the smooth surface is not as necessary as in the embodiment shown in Fig. 4. Furthermore, since absolutely complete reduction of reflection at a smooth surface is not possible, the embodiment shown in Fig. 4 may still suffer slightly from front surface reflection, whereas in Fig. 5 such front surface reflections are diffused so as to be less annoying.

Having thus described two preferred embodiments of our invention, we wish to point out that it is not limited to these structures but is of the scope of the appended claims.

What we claim and desire to secure by Letters Patent of the United States is:

1. A translucent screen for displaying optical images comprising a translucent plate one surface of which is rough and an optical interference layer for reducing reflection coated on the rough surface.

2. A screen according to claim 1 in which a reflection reducing optical interference layer is also coated on the other surface of the plate.

3. A screen according to claim 1 which is transparent except for said rough surface.

4. A translucent screen for displaying optical images formed by a lens system comprising a translucent plate with the surface toward the lens rough and an optical interference layer for reducing reflection coated on the rough surface.

5. A translucent screen for displaying optical images formed by a lens system comprising a translucent plate with the surface facing away from the lens rough and an optical interference layer for reducing reflection coated on the rough surface.

6. A rear projection system comprising means for forming an optical image in a plane, a light transmitting sheet with one surface thereof in said plane and rough to display said image, both surfaces of said sheet being coated with optical interference layers to reduce reflection.

EDWIN E. JELLEY.
HENRY C. STAEHLE.